United States Patent
Schuschke et al.

(10) Patent No.: US 9,815,023 B2
(45) Date of Patent: Nov. 14, 2017

(54) METHOD FOR PURIFYING EXHAUST GAS AND FOR REGENERATING AN OXIDATION CATALYST

(71) Applicant: Clariant International Ltd., Muttenz (CH)

(72) Inventors: Margit Schuschke, Bruckmuehl (DE); Frank Klose, Rosenheim (DE); Andane Stein, Bruckmuehl (DE); Arno Tissler, Tegernheim (DE); Olaf Buettner, Kolbermoor (DE); Grigory Reznikov, Bruckmuehl (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/430,159

(22) PCT Filed: Sep. 20, 2013

(86) PCT No.: PCT/EP2013/069579
§ 371 (c)(1),
(2) Date: Mar. 20, 2015

(87) PCT Pub. No.: WO2014/044798
PCT Pub. Date: Mar. 27, 2014

(65) Prior Publication Data
US 2015/0231563 A1    Aug. 20, 2015

(30) Foreign Application Priority Data
Sep. 21, 2012   (DE) .................. 10 2012 018 629

(51) Int. Cl.
| | | |
|---|---|---|
| *B01D 53/86* | (2006.01) | |
| *B01D 53/96* | (2006.01) | |
| *B01J 23/10* | (2006.01) | |
| *B01J 23/30* | (2006.01) | |
| *B01J 23/44* | (2006.01) | |
| *B01J 29/74* | (2006.01) | |
| *B01J 38/02* | (2006.01) | |

(52) U.S. Cl.
CPC ....... *B01D 53/8671* (2013.01); *B01D 53/864* (2013.01); *B01D 53/96* (2013.01); *B01J 23/10* (2013.01); *B01J 23/30* (2013.01); *B01J 23/44* (2013.01); *B01J 29/7415* (2013.01); *B01J 38/02* (2013.01); *B01D 2251/2062* (2013.01); *B01D 2251/2067* (2013.01); *B01D 2255/1021* (2013.01); *B01D 2255/1023* (2013.01); *B01D 2255/2061* (2013.01); *B01D 2255/2063* (2013.01); *B01D 2255/2065* (2013.01); *B01D 2255/2092* (2013.01); *B01D 2255/20707* (2013.01); *B01D 2255/20776* (2013.01); *B01D 2255/30* (2013.01); *B01D 2255/502* (2013.01); *B01D 2257/93* (2013.01); *B01D 2258/025* (2013.01); *B01D 2258/0233* (2013.01); *B01D 2258/0283* (2013.01); *B01D 2258/0291* (2013.01)

(58) Field of Classification Search
CPC ........ F01N 3/103; F01N 3/206; F01N 3/2066; B01D 46/0057; B01D 53/38; B01D 53/8678; B01D 53/96; B01D 2258/00; B01D 2259/40088
See application file for complete search history.

(56) References Cited

U.S. PATENT DOCUMENTS

| | | | | |
|---|---|---|---|---|
| 5,643,545 | A * | 7/1997 | Chen .................... | B01D 53/864 423/240 S |
| 6,887,815 | B2 | 5/2005 | Tissler et al. | |
| 7,308,788 | B1 * | 12/2007 | Das ........................ | F01N 3/103 60/279 |
| 7,631,488 | B2 * | 12/2009 | Chung ................ | B01D 53/944 502/344 |
| 7,797,928 | B2 * | 9/2010 | Friedrich .............. | F01N 3/0222 60/274 |
| 9,018,120 | B2 | 4/2015 | Hurgobin et al. | |
| 9,103,257 | B2 * | 8/2015 | Choi ...................... | F01N 3/103 |
| 9,169,753 | B2 | 10/2015 | Twigg et al. | |
| 9,517,456 | B2 | 12/2016 | Patchett et al. | |
| 2009/0208394 | A1 | 8/2009 | Li | |
| 2010/0050609 | A1 * | 3/2010 | Parmentier ............. | F01N 3/103 60/286 |

(Continued)

FOREIGN PATENT DOCUMENTS

| | | |
|---|---|---|
| AT | 508921 | 5/2011 |
| CN | 1832794 | 9/2006 |

(Continued)

OTHER PUBLICATIONS

PCT International Search Report for PCT/EP2013/069579, dated Mar. 18, 2014.
International Preliminary Report on Patentability for PCT/EP2013/069579, dated Mar. 24, 2015.
English Abstract for DE 101 30 872, Jan. 20, 2003.
English Abstract for EP 0 995 080, Apr. 26, 2000.
English Abstract for JP 2004-209356, Jul. 29, 2004.
D.S. Coombs et al., Canadian Mineralogist, vol. 35, pp. 1571-1606, 1997.
M. Horiuchi et al., "The Effects of Flow-through Type Oxidation Catalysts on the Particulate Reduction of 1990's Diesel Engines", SAE Technical Paper 900600, 1990.

*Primary Examiner* — Timothy Vanoy
(74) *Attorney, Agent, or Firm* — Anthony Bisulca

(57) ABSTRACT

The invention relates to a method for purifying exhaust gas and for regenerating an oxidation catalytic converter, comprising treating the exhaust gas in an oxidation catalytic converter, which comprises a catalytically active material, which contains at least one noble metal and/or at least one base transition metal, wherein the oxidation catalytic converter is operated continuously or at times at a temperature that causes the oxidation of soot particles and/or carbon particles, and/or wherein the oxidation catalytic converter is periodically heated to a temperature that causes the oxidation of soot particles and/or carbon particles.

22 Claims, 4 Drawing Sheets

(56) References Cited

U.S. PATENT DOCUMENTS

Figure 1A:
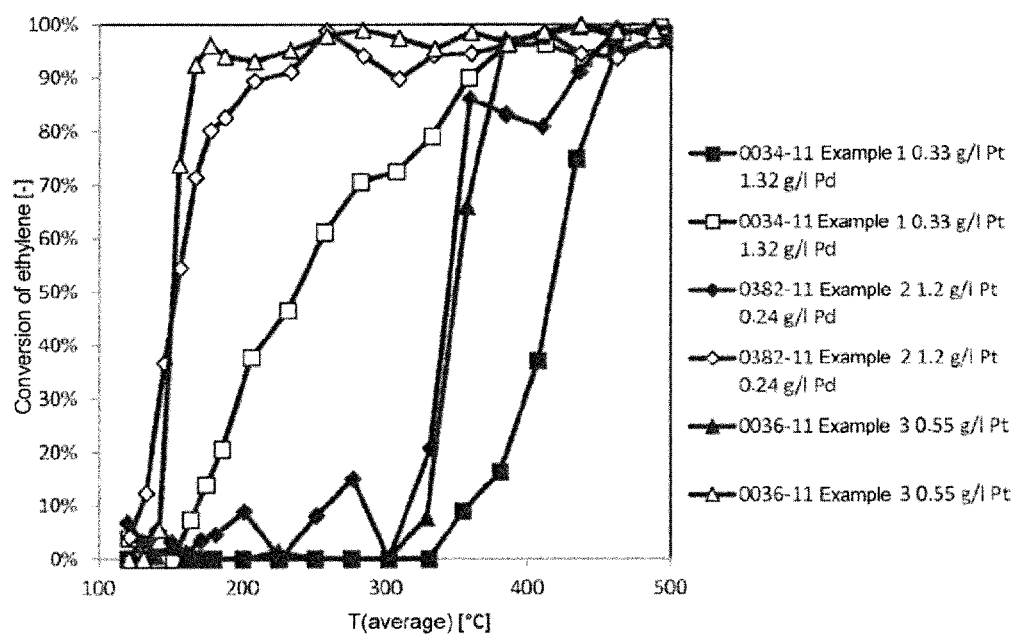

| | | | | |
|---|---|---|---|---|
| 2011/0239623 A1* | 10/2011 | Leustek | ................. | F01N 3/025 60/274 |
| 2011/0311423 A1* | 12/2011 | Clarke | ................ | B01D 53/864 423/235 |
| 2013/0042597 A1* | 2/2013 | Gonze | ................... | F01N 3/103 60/274 |
| 2013/0086886 A1* | 4/2013 | Gonze | ................... | F01N 3/103 60/274 |
| 2014/0033923 A1* | 2/2014 | Yabe | ................ | B01D 46/063 95/278 |
| 2014/0053534 A1* | 2/2014 | Choi | ...................... | F01N 3/103 60/274 |
| 2016/0097313 A1* | 4/2016 | Im | ......................... | F01N 3/103 60/274 |
| 2016/0168497 A1 | 6/2016 | Dahms | | |
| 2016/0310895 A1 | 10/2016 | Tissler et al. | | |

FOREIGN PATENT DOCUMENTS

| | | | | |
|---|---|---|---|---|
| DE | 101 30 872 | | 1/2003 | |
| DE | 10 2004 006861 | | 9/2005 | |
| DE | 102004006861 A1 * | | 9/2005 | ............ B01D 29/00 |
| DE | 10 2006 033452 | | 1/2008 | |
| EP | 0 995 080 | | 4/2000 | |
| EP | 1 479 883 | | 11/2004 | |
| JP | 2004-209356 | | 7/2004 | |
| JP | 2006-520264 | | 9/2006 | |
| WO | WO 9519836 A1 * | | 7/1995 | .......... B01D 53/864 |
| WO | WO 2011/120059 | | 12/2011 | |
| WO | WO 2012/085572 | | 6/2012 | |

* cited by examiner

METHOD FOR PURIFYING EXHAUST GAS AND FOR REGENERATING AN OXIDATION CATALYST

The present invention relates to a method for cleaning offgas and for regenerating an oxidation catalyst.

Since the advent of offgas cleaning, great efforts have been made to lower pollutant emissions in combustion processes to ever lower levels. For offgas aftertreatment, for example, systems including the following have already been implemented in part or are in the process of testing:
- selective catalytic reduction (SCR method)
- $NO_x$ reduction catalytic converter (NSR)
- oxidation catalysts
- catalytically coated particulate filters
- combinations, for example continuously regenerating traps (CRT systems), SCRT methods (selective catalytic reduction technology), DPNR methods (diesel particulate $NO_x$ reduction).

An SCR catalytic converter, for example, is a catalytic converter which enables the selective catalytic reduction of nitrogen oxides from exhaust gases from internal combustion engines, and also from power plants. An SCR catalytic converter of this kind selectively reduces the nitrogen oxides NO and $NO_2$ (generally referred to as $NO_x$), usually with addition of $NH_3$ (ammonia) for the reaction. The reaction products formed are therefore primarily water and nitrogen, which are harmless substances. If more reducing agent is metered in than is converted in the reduction with $NO_x$, there can be unwanted $NH_3$ slip. The removal of the $NH_3$ can be achieved by means of an additional oxidation catalyst beyond the SCR catalytic converter. This barrier catalytic converter oxidizes any ammonia that occurs.

At present, for reduction of nitrogen oxide levels, both in the power plant sector and in the automotive sector, predominantly catalytic converters based on tungsten oxide, vanadium pentoxide and titanium dioxide (VWT catalytic converters) are used. As well as the VWT catalytic converters used to date, zeolites which have been metal-exchanged with Fe or Cu, for example, have also been found to be promising catalytic converters in SCR catalysis.

The hydrocarbon and CO emissions can be eliminated from the offgas by means of oxidation catalyst. For example, diesel oxidation catalysts (DOCS) consist essentially of a support structure made from ceramic, an oxide mixture (washcoat) and the catalytically active noble metal components such as platinum, palladium and rhodium. The DOC fulfills the function of oxidizing CO and hydrocarbons over the catalyst to give $CO_2$ and $H_2O$.

Oxidation catalysts used may also be metal-exchanged zeolites. These zeolites contain, for example, noble metals introduced by metal exchange, for example Pt or Pd.

The term "zeolite" is generally understood, according to the definition of the International Mineralogical Association (D. S. Coombs et al., Can. Mineralogist, 35, 1997, 1571), to mean a crystalline substance from the group of the aluminum silicates having a three-dimensional network structure of the general formula

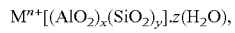
$$M^{n+}[(AlO_2)_x(SiO_2)_y].z(H_2O),$$

which consists of $SiO_4/AlO_4$ tetrahedra joined by common oxygen atoms to form a regular three-dimensional network. The zeolite structure contains open cavities in the form of channels and cages normally occupied by water molecules and extra framework cations which are exchangeable. For each aluminum atom there is one excess negative charge which is compensated for by these cations. The zeolites differ mainly by the geometry of the cavities which are formed by the rigid network of the $SiO_4/AlO_4$ tetrahedra. The entrances to the cavities are formed by "rings" of 8, 10 or 12 atoms (narrow-, mid- and wide-pore zeolites). Particular zeolites exhibit a homogeneous structure (e.g. ZSM-5 with MFI topology) with linear or zigzag channels; in others there are adjoining larger cavities beyond the pore orifices, for example in the Y and A zeolites, with the FAU and LTA topologies.

Cement works and other industrial processes with high calorific values emit carbon monoxide (up to the $g/m^3$ (STP) range), nitrogen oxides and organic pollutants which are released in combustion processes which are required for generation of the necessary high temperatures. To date, reduction of nitrogen oxide levels in such plants has been accomplished using not only thermal methods (selective noncatalytic reduction; NSCR) but also using vanadium-tungsten-titanium (VWT) catalytic converters for selective catalytic reduction (SCR) with ammonia. These are operated at about 220 to 280° C. and typically have a lifetime in the region of months. However, a problem with these catalytic converters is the relatively high ammonia slip which can be limited only by substoichiometric dosage at the cost of the efficiency of the reduction in nitrogen oxide levels.

Often, in such processes with high calorific values, what are called substitute fuels are used for economic reasons. These are, for example, used tires, used solvents and other combustible wastes. The effect of the use of these substitute fuels is that ultrafine soot particles can form in the combustion process. These soot particles can lead to rapid deactivation of oxidation catalysts for degradation of carbon monoxide and organic pollutants when they are operated under the conditions of SCR with VWT catalytic converters, and so service lives in the region of hours at best are achieved here. For example, fresh oxidation catalysts containing noble metals as catalytically active components can be completely deactivated in offgas treatment in cement works after 2 to 6 hours.

It is an object of the invention to specify a method for cleaning offgas, in which the deactivation of the oxidation catalyst used is avoided or reduced.

This object is achieved by a method for cleaning offgas and for regenerating an oxidation catalyst, comprising treating the offgas in an oxidation catalyst comprising a catalytically active material comprising at least one noble metal and/or at least one base transition metal, wherein the oxidation catalyst is operated continuously or intermittently at a temperature which brings about the oxidation of soot and/or carbon particles, and/or wherein the oxidation catalyst is heated periodically to a temperature which brings about the oxidation of soot and/or carbon particles.

It has been found that, surprisingly, the deactivation of oxidation catalysts for degradation of carbon monoxide and organic pollutants can be countered by regenerating these catalytic converters either constantly at the temperature which brings about the oxidation of soot and/or carbon particles or periodically at such a temperature. The temperature which brings about the oxidation of soot and/or carbon particles may especially be above 280° C., preferably above 300° C. or 320° C., more preferably above 350° C. or 400° C.

Further features and useful aspects are apparent from the description of embodiments, the figures and the dependent claims which follows.

Figure 1B:
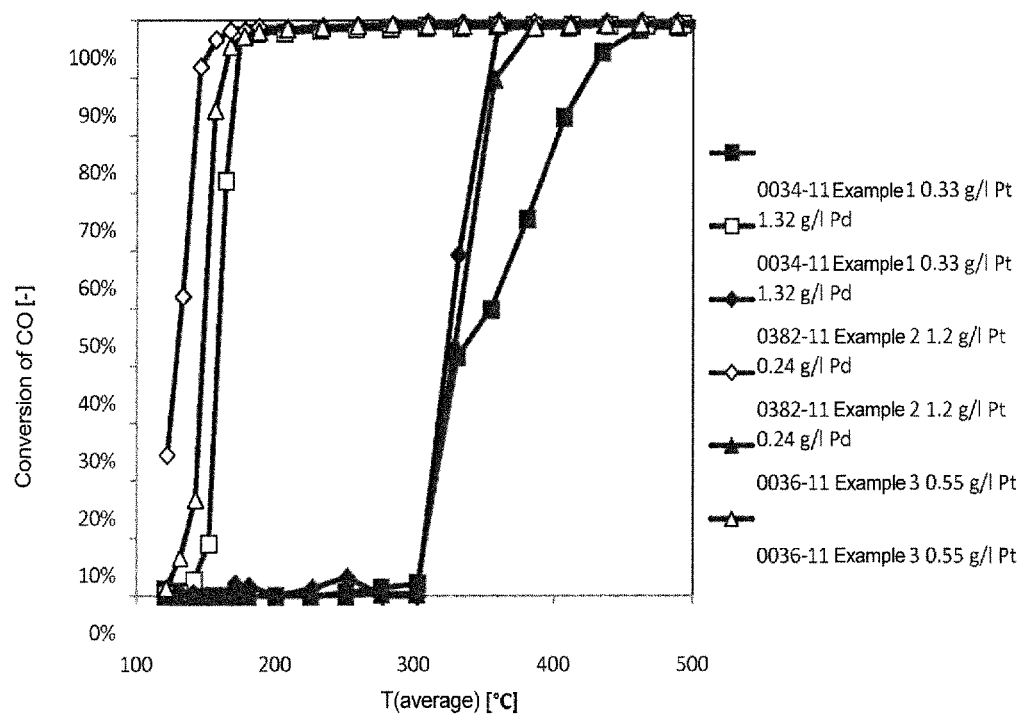
Figure 2:
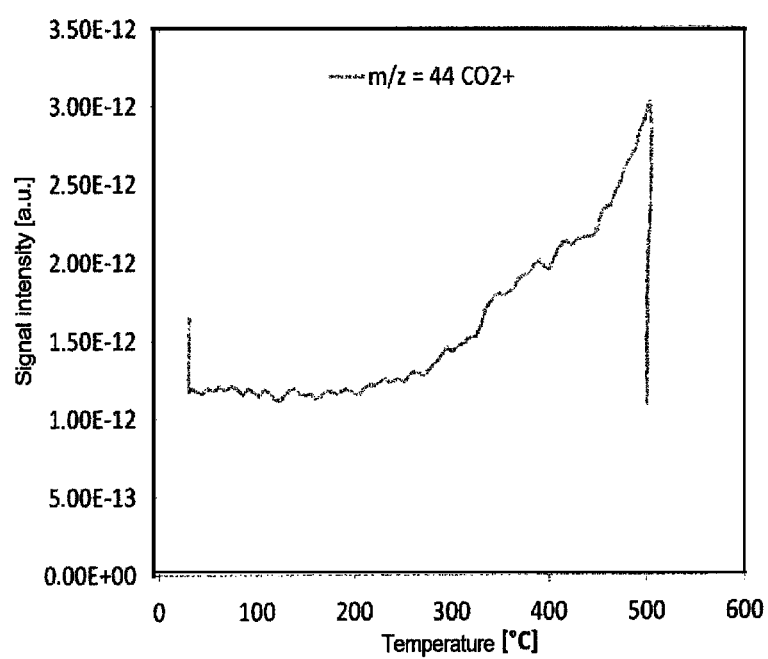
Figure 3:
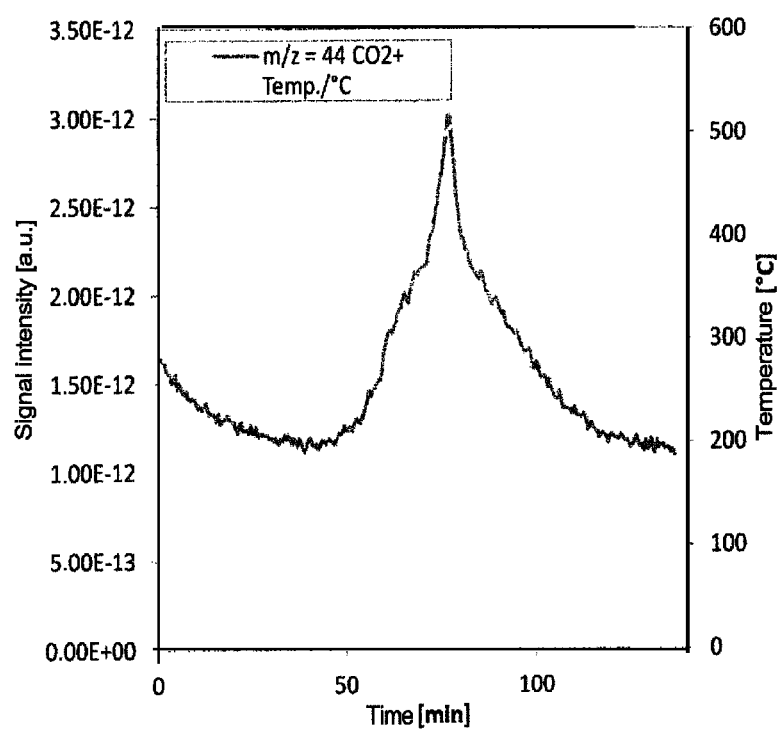

All features of embodiments that are described here and are not mutually exclusive can be combined with one another. Elements of one embodiment can be utilized in the other embodiments without further mention. Embodiments of the invention are now described in detail by the examples which follow with reference to figures, without any intention of restricting them thereby. The figures show:

FIG. 1a the conversion of ethylene as a function of temperature for examples 1 to 3;

FIG. 1b the conversion of CO as a function of temperature for examples 1 to 3;

FIG. 2 the thermodesorption of $CO_2$ (m/z=44) for example 2 as a function of temperature; and FIG. 3 the thermodesorption of $CO_2$ (m/z=44) for example 2 as a function of time.

In the description of embodiments which follows, the embodiments of the invention are described hereinafter with reference to a Pt- and/or Pd-containing oxidation catalyst, without restricting the invention thereto.

The term "comprising" consists in embodiments "essentially consisting of" or "consisting of" and can be replaced thereby. This applies correspondingly to grammatical derivatives of the word "comprising". In addition, for the description of ranges of values, the specification of a broad range together with narrower alternative or preferred ranges also discloses ranges which can be formed by any desired combination of specified lower range limits with specified upper range limits.

The method of the invention serves for cleaning of offgas and for simultaneous regeneration of oxidation catalyst which is used for the cleaning of the offgas. This involves oxidation of soot present on or in the oxidation catalyst, which forms during the catalysis from organic pollutants, for example, such as olefins and aromatics, thus rendering it harmless, and/or removal thereof from the oxidation catalyst. The soot may especially comprise soot particles or carbon particles.

In embodiments of the method, the offgas is treated in an oxidation catalyst comprising a catalytically active material containing at least one noble metal and/or at least one base transition metal, wherein the oxidation catalyst is operated continuously or intermittently at a temperature of more than 280° C., preferably more than 300° C., more preferably more than 350° C., and/or wherein the oxidation catalyst is heated periodically to a temperature of more than 280° C., preferably more than 300° C., more preferably more than 350° C.

In one embodiment, the method comprises treating the offgas in an oxidation catalyst comprising a catalytically active material comprising at least one noble metal and/or at least one base transition metal, wherein the oxidation catalyst is operated continuously or intermittently at a temperature of more than 280° C., preferably more than 300° C., more preferably more than 350° C. The operating of the oxidation catalyst or the operation of the oxidation catalyst may be understood to mean the catalytic cleaning, especially the oxidation, of the offgas or of components of the offgas.

In another embodiment, the method comprises treating the offgas in an oxidation catalyst comprising a catalytically active material comprising at least one noble metal and/or at least one base transition metal, wherein the oxidation catalyst is heated periodically to a temperature of more than 280° C., preferably more than 300° C., more preferably more than 350° C. The heating of the oxidation catalyst can be conducted, for example, intermittently, for example during an interruption in the catalytic process, or during the operation of the catalytic converter in the catalytic process.

A further embodiment of the method comprises a combination of the continuous or intermittent operation of the oxidation catalyst to the temperature which brings about the oxidation of soot and/or carbon particles, and periodic heating of the oxidation catalyst to the temperature which brings about the oxidation of soot and/or carbon particles. In this case, different temperatures can be set for the continuous or intermittent operation and the periodic heating. For example, the oxidation catalyst can be operated continuously or intermittently at more than 280° C. and can additionally be heated periodically to, for example, 350 to 400° C., in order to prevent deactivation of the oxidation catalyst.

The offgas to be cleaned in the method of embodiments can be produced by combustion with a high calorific value. For example, wood, biomass, mineral oil or natural gas can be burnt in combustion processes which lead to an extremely high evolution of heat. In addition, the offgas can be produced by combustion of substitute fuels such as used oil or used tires. Moreover, the offgas can arise in the production of cement or in sintered metal plants. In the method of embodiments, the offgas can be produced in the combustion of wood, biomass, mineral oil, natural gas, used oil, used tires, used solvents, industrial or communal refuse, waste and/or controlled waste, and/or in the manufacture of cement or in a sintered metal plant. In other words, the oxidation catalyst comprising a catalytically active material containing at least one noble metal and/or at least one base transition metal used in embodiments can be used for cleaning of offgas which is produced by combustion of wood, biomass, mineral oil, natural gas, used oil, used tires, used solvents, industrial or communal refuse, waste and/or controlled waste, and/or in the manufacture of cement or in a sintered metal plant.

In the method of embodiments, the intermittent operation of the oxidation catalyst at the temperature which brings about the oxidation of soot and/or carbon particles can be conducted at time intervals of 0.5 to 10 hours, preferably 1 to 6 hours. The same applies to the periodic heating of the oxidation catalyst, in which the oxidation catalyst can be heated to the aforementioned temperatures.

In addition, in the intermittent operation or in the periodic heating of the oxidation catalyst, the temperature which brings about the oxidation of soot and/or carbon particles can be set for a period in the range from preferably 0.1 to 3 and more preferably of 0.25 to 2 hours.

In embodiments of the method, it is also possible, in the continuous or intermittent operation or in the periodic heating of the oxidation catalyst, to set the temperature which brings about the oxidation of soot and/or carbon particles by means of the offgas and/or by means of a heating unit and/or a heat exchanger.

In addition, in embodiments of the method, the periodic heating of the oxidation catalyst can be conducted during or outside the operation of the oxidation catalyst. In addition, the periodic heating of the oxidation catalyst can be conducted in an apparatus in which the oxidation catalyst is used for cleaning of the offgas.

The method of embodiments has the advantage that the regeneration of the oxidation catalyst can be effected at the site of the use thereof, especially without the need to deinstall the oxidation catalyst from the offgas cleaning plant.

In embodiments of the method, the continuous or intermittent operation of the oxidation catalyst is conducted at a temperature of more than 280° C., preferably more than 300° C., more preferably more than 350° C., in the presence of oxygen and/or air. For this purpose, oxygen can be supplied to the offgas. However, it is also possible to utilize the real offgas, i.e. the pure combustion gas, as oxygen source, provided that enough oxygen is present therein.

The regeneration of the oxidation catalyst by the periodic heating of the invention can also be implemented in the presence of oxygen and/or air. The regeneration can be effected, for example, by stopping the flow of the offgas into the oxidation catalyst and supplying oxygen or a mixture of oxygen and other gases, for example inert gases. Alternatively, the offgas stream can be stopped and the oxidation catalyst can be regenerated in the presence of the remaining offgas which is still within the oxidation catalyst and contains oxygen. If the real offgas contains sufficient amounts of oxygen, regeneration of the oxidation catalyst is also possible under real offgas without stoppage of the gas supply—i.e. by increasing the temperature alone.

Preferably, the gas supplied in the continuous or intermittent operation of the oxidation catalyst may contain at least 0.1% by volume, more preferably at least 2% by volume and even more preferably at least 5% by volume of oxygen. If a regeneration step is conducted, for avoidance of a significant exotherm, it may also be advantageous to limit the oxygen content to values (<1% by volume) at first, and then to increase it in the course of the regeneration step.

In the method according to one of the embodiments, the temperature may be within a range above 320° C., preferably between 350 and 550° C., in order to bring about regeneration. The optimal regeneration temperature can be chosen, for example, as a function of the combustion process and the offgases that arise therein.

The oxidation catalyst is preferably an oxidation catalyst which is used for degradation of CO and/or hydrocarbons. For this purpose, for example, the noble metal used in the oxidation catalyst may be at least one metal from the platinum group of the Periodic Table and/or Pt and/or Pd. As an alternative to the noble metal or in addition, the oxidation catalyst may contain at least one base transition metal, preferably from the group of Co, Mn, Cu, Cr and Fe. The transition metal may be present in the oxidation catalyst as an oxide and/or mixed oxide and/or be reducible. In addition, in the oxidation catalyst, the catalytically active material can be used as an all-active extrudate or as a washcoat on a support body.

In the method of embodiments, the catalytically active material may comprise a macroporous zeolite material containing at least one noble metal and/or at least one base transition metal, preferably from the group of Co, Mn, Cu, Cr and Fe. The transition metal may be present in the form of an oxide and/or mixed oxide and/or be reducible. In addition, the catalytically active material may contain a porous binder and/or at least one oxide of Si, Ti and/or W. Moreover, the catalytically active material may include alumina doped with Ce, La and/or Y. In addition, the catalytically active material may contain at least one oxide and/or mixed oxide of the elements from groups IIIa, IVa, IIIb and/or IVb of the Periodic Table of the Elements, preferably an oxide and/or mixed oxide of Al, Si, Ti and/or Zr, further preferably at least one additive such as a compound of the alkali metals and/or alkaline earth metals.

In embodiments, the catalytically active material has a specific surface area measurable by means of the BET method to DIN ISO 9277:2003-05 of at least 0.1 m$^2$/g, preferably at least 10 m$^2$/g and more preferably at least 20 m$^2$/g.

In a further embodiment of the method, the oxidation catalyst can be operated in combination with one or more catalytic converters. This additional catalytic converter may be selected from a catalytic converter for the removal of nitrogen oxides, a catalytic converter for selective catalytic reduction, a catalytic converter comprising vanadium, tungsten and/or titanium, and a catalytic converter comprising a zeolite containing noble or transition metals such as Cu and/or Fe. The method of this embodiment, with use of an additional catalytic converter for reducing nitrogen oxide levels, can serve both to reduce the levels of CO and organic pollutants and to reduce the level of nitrogen oxides.

If the oxidation catalyst is operated in combination with one or more additional catalytic converters, the method may comprise the following steps: treating the offgas in the oxidation catalyst; introducing reducing agents into the offgas; and treating the offgas in the catalytic converter for selective catalytic reduction; wherein the introduction of the reducing agent is conducted prior to the treatment of the offgas in the catalytic converter for selective catalytic reduction. The treatment of the offgas in the oxidation catalyst can be conducted prior to the introduction of the reducing agent into the offgas or after the treatment of the offgas in the catalytic converter for selective catalytic reduction. It is first possible to feed in the reducing agent, then the offgas, in the catalytic converter for selective catalytic reduction and then to treat it in the oxidation catalyst. In addition, the reducing agent used may be ammonia and/or urea, the latter also as an aqueous solution.

In the method of embodiments in which the oxidation catalyst is operated in combination with one or more catalytic converters, the offgas can be cleaned at a temperature above 300° C. and/or below 600° C., preferably above 350° C. and below 550° C., based in each case on the temperature in the oxidation catalyst or catalyst bed.

Examples of catalytic converters for reducing nitrogen oxide levels which can be used in the method of the invention in combination with an oxidation catalyst are the zeolitic catalytic converters containing a transition metal as catalytically active component. Illustrative processes for production of such catalytic converters are described in EP 0955080 A1 and in DE 10 2006 033452 A1. Particular mention should be made here of Cu zeolites and/or Fe zeolites.

According to the invention, oxidation catalysts for degradation of CO and hydrocarbons in cement works and other comparable applications with high calorific values are operated either constantly or intermittently above 280° C., for example in the range from 350 to 550° C., or heated periodically to a temperature within the same temperature range. In the case of permanent operation above 350° C., one option is, for example, combination with a VWT or iron zeolite catalytic converter for removal of nitrogen oxides. An iron zeolite catalytic converter, for example, in the real gas from a cement works ("low dust" side), exhibits a reduction in nitrogen oxide levels of >70% (fresh value ~90%, GHSV=12 000 h$^{-1}$ with 10% by volume of H$_2$O in the feed) after 2500 hours of operation. Thus, such a catalytic converter is suitable for combined removal of nitrogen oxides, organic substances and carbon monoxide in the method of the invention. Moreover, the iron zeolite catalytic converter has the advantage over VWT catalytic converters of selectively oxidizing excess ammonia to nitrogen and water.

In embodiments of the method, the oxidation catalyst can be used in the form of an all-active extrudate, for example in the form of particles or honeycombs, or in the form of a supported catalyst. For example, the oxidation catalyst as an all-active extrudate may take the form of a honeycomb.

In the form of a supported catalyst, also called a coated catalyst, the oxidation catalyst takes the form of a solid-state catalyst which is produced by coating a (typically nonporous) support body, for example a honeycomb, with a porous layer containing the actually catalytically active species. Examples of these are catalysts in which a layer containing the catalytically active material, called a washcoat, is applied to an inert nonporous support composed of quartz ($SiO_2$), cordierite, magnesium silicate (steatite), silicon carbide, tin oxide, porcelain or metals, especially steel alloys, etc. In the supported catalyst, the support body serves merely for shaping ("structural support"). In contrast to supported catalysts in which the active elements are dispersed in a porous support, the typically nonporous support body in a supported catalyst is encased by a layer containing the active species.

The supported catalyst can be produced by impregnation methods in which the catalytically active species, for example noble metals such as Pd, Pt, Au and/or Ag etc., and/or base transition metals, preferably from the group of Cu, Mn, Co, Cr and/or Fe, are applied as a solution of a (reducible) compound of the species in a disperse manner to a porous support, for example $SiO_2$, $Al_2O_3$, $TiO_2$, $ZrO_2$, etc. In the supported catalysts produced by the impregnation method, there are usually physicochemical interactions between support and active species which influence the catalytic process.

In further embodiments of the method of the invention, the oxidation catalyst may comprise a macroporous noble metal-containing zeolite material and a porous $SiO_2$-containing binder, wherein the oxidation catalyst may have a proportion of micropores of more than 70%, based on the total pore volume of the oxidation catalyst. In this case, the zeolite material may have an aluminum content of less than 2 mol %. Preferably, the zeolite material contains 0.5% to 6.0% by weight of noble metal. Moreover, the weight ratio of zeolite material/binder may be 80:20 to 60:40. The BET surface area of the oxidation catalyst is, for example, 10 to 800 $m^2/g$, and the integral pore volume of the oxidation catalyst may be greater than 100 $mm^3/g$.

An oxidation catalyst of this kind may have been produced, for example, by: introducing a noble metal precursor compound into a microporous zeolite material; calcining the zeolite material laden with the noble metal precursor compound; mixing the zeolite material laden with the noble metal compound with a porous $SiO_2$-containing binder and a solvent; drying and calcining the mixture comprising the zeolite material laden with the noble metal compound and the binder. In addition, the mixture obtained after the mixing of the zeolite material laden with the noble metal compound with a porous $SiO_2$-containing binder and a solvent can be applied to a support body. One of the calcining operations or both calcining operations may have been conducted under Ar.

In addition, the zeolite material is preferably a material selected from the group consisting of AFI, AEL, BEA, CHA, EUO, FAU, FER, KFI, LTL, MAZ, MOR, MEL, MTW, OFF, TON and MFI. Moreover, the noble metal and/or the base transition metal may be within the internal pore system of the zeolite, for example in the form of noble metal particles and/or transition metal oxide particles.

In further embodiments of the method, the noble metal is selected from the group consisting of rhodium, iridium, palladium, platinum, ruthenium, osmium, gold and silver, or combinations of the noble metals mentioned.

In embodiments of the method, the base transition metal is selected from the group consisting of Co, Mn, Cu, Cr and Fe or a combination of the transition metals mentioned and/or is present as an oxide and/or is reducible.

In embodiments of the method, the oxidation catalyst may comprise Pd and/or Pt and oxides of Si, Ti and/or W. The oxidation catalyst here may either take the form of an all-active extrudate composed of oxides of Si, Ti and/or W, the outer layer of which has been impregnated with Pd and/or Pt, or the form of a supported oxidation catalyst in which a layer comprising the Pd and/or Pt and the oxides of Si, Ti and/or W has been applied to a support body.

For production of such an oxidation catalyst, a composition comprising $SiO_2$, $TiO_2$ and/or $WO_3$, a solvent and at least one binder comprising an Si-containing and/or Ti-containing compound may be used. In this case, the Si-containing compound may be a silane, and/or the Ti-containing compound may be a $Ti^{4+}$ coordination compound. In addition, the composition may additionally comprise a Pd-containing precursor compound and/or a Pt-containing precursor compound. In order to produce the oxidation catalyst, the composition may either be shaped to give an all-active extrudate or be applied to a support body in the form of an outer layer. Subsequently, the extrudate or support body can be dried and calcined. In addition, after the drying and calcining of the extrudate or support body, when the composition does not contain any Pd-containing precursor compound and/or Pt-containing precursor compound, a Pd-containing precursor compound and/or a Pt-containing precursor compound may be applied. Finally, a calcination of the extrudate or support body may also be conducted.

When the oxidation catalyst is in the form of an all-active extrudate, the proportion of Pd and/or Pt and/or of base transition metals, preferably from the group of Cu, Mn, Co, Cr and Fe, may be in the range from 0.01% to 20% by weight, based on the total weight of the oxidation catalyst. When the oxidation catalyst is used in the form of a supported catalyst, the proportion of Pd and/or Pt and/or of base transition metals, preferably from the group of Cu, Mn, Co, Cr and Fe, may preferably be in the range from 0.01% to 20% by weight, based on the total mass of the layer.

In the oxidation catalyst comprising oxides of Si, Ti and/or W of embodiments of the method, the proportion of Ti, based on $TiO_2$, may be in the range from 70% to 95%, based on the weight of the oxides of Si, Ti and/or W. In addition, in the oxidation catalyst of embodiments, the proportion of Si, based on $SiO_2$, may be in the range from 4% to 20% by weight, based on the total weight of the oxides of Si, Ti and/or W.

In the oxidation catalyst of embodiments of the method in which the catalytically active material includes alumina doped with Ce, La and/or Y, the proportion of Ce, La and Y may be 0.1%-30% by weight, preferably 1% to 20% by weight, further preferably 2% to 15% by weight, based on the mass of washcoat or on mass of all-active extrudate or catalyst particles. In this case, the catalytically active material may have been applied as a washcoat on a support body.

In the cases in which the catalytically active material contains at least one oxide and/or mixed oxide of the elements from groups IIIc, IVa, IIIb and/or IVb of the Periodic Table of the Elements, preferably oxides and/or mixed oxides of Al, Si, Ti and/or Zr, the proportion of these oxides may be 0.001% to 99.999% by weight, based on the catalytically active material. In the cases in which the catalytically active material contains at least one additive, such as a compound of the alkali metals and/or alkaline earth metals, the proportion of these additives may be 0.1% to 30% by weight, based on the catalytically active material.

The invention is now illustrated in detail by some working examples, but they should not be regarded as having any limiting effect on the scope of the invention.

Methods

Elemental Analysis by ICP:

To determine the content of noble metals and other elements, ICP-AES (inductively coupled plasma atomic emission spectroscopy) was conducted with the ICP Spectro Modula instrument. The following chemicals were used: HF 40% p.a., HCl 37% p.a. The sample was in finely ground form. 50 mg of sample were weighed into a 50 mL plastic tube and admixed with 2 mL of hydrofluoric acid and 2 mL of hydrochloric acid. Digestion was effected in the heating block at 85° C. until a clear solution formed. Then the sample was equilibrated, diluted and shaken. All elements were measured in the ICP. For example, Pt and Pd were measured with the following settings: wavelength: 214, 423 mm, standards: 10, 30, 50 ppm. All the standards were calibrated with $SiO_2$, HF and HCl. The evaluation was based on the following calculation: w(E* in percent)=β(E*-measurement in mg/L)×V(standard flask in L)×100/m(starting weight in mg) (E*-respective element).

Thermal Analysis Plots

Thermal desorption (mass 44) from/out of the oxidation catalysts was detected using a NETZSCH STA 409 PC/PG thermal analyzer coupled to a Balzers MID quadrupole mass spectrometer. In the analyzer, the sample was heated to 500° C. under air at 10 K/min and then this temperature was maintained for one hour. From the gases released from the sample, a substream was passed into the connected mass spectrometer. The mass number (m/z) 44 was extracted from the mass spectra obtained over the duration of the experiment, which corresponds here to the $CO_2^+$ fragment. Assignment of the m/z=44 signal to $N_2O$ can be ruled out, since no N-containing species were present and the oxidation of atmospheric nitrogen at these temperatures can be ruled out.

WORKING EXAMPLES

Three examples of the method of the invention were conducted. The oxidation catalysts used in examples 1 to 3 are shown in table 1. Each was a catalytic converter having a washcoat containing the particular noble metal on a body cordierite support having a cell density of 100 cpsi. The conditions during the test runs of the method can be found in table 2. The oxidation catalysts of examples 1 to 3 have each been returned from cement works in which they have been contacted with real offgas ("low dust" side) at 250 to 280° C. As offgas to be cleaned, a mixture of hydrocarbons, including ethylene, and CO was used.

TABLE 1

| | Washcoat | Pt [g/L] | Pd [g/L] |
|---|---|---|---|
| Example 1 | Ce—, La— and Y-doped $Al_2O_3$ | 0.33 | 1.32 |
| Example 2 | $TiO_2$—$WO_3$—$SiO_2$ | 1.2 | 0.24 |
| Example 3 | Pt-BEA150 as noble metal-containing zeolite | 0.55 | — |

TABLE 2

| Reactant mixture | Oxygen concentration [% by vol.] | Water concentration [% by vol.] | GHSV (gas hourly space velocity) [$h^{-1}$] | Temperature ramp [° C.] |
|---|---|---|---|---|
| 1000 ppmv $CH_4$, 200 ppmv $C_2H_6$, 200 ppmv $C_2H_4$, 200 ppmv $C_3H_3$ and 800 ppmv CO | 10 | 3.0 | 40 000 | 120-550-120 |

FIGS. 1a and 1b show the conversion of ethylene and the conversion of CO, in each case as a function of temperature of examples 1 to 3 of the method of the invention. The solid symbols for the individual measurement points correspond to the test runs during a rising temperature ramp. The open symbols for the individual measurement points correspond to the test runs during a falling temperature ramp.

For all three oxidation catalysts shown in FIG. 1, no activity at all is apparent at first in the rising part up to 300° C. The starting state of the 3 examples in FIG. 1 is that after deactivation in the cement works. Surprisingly, in the methods of the examples, however, distinct activation of the catalytic converters is to be observed above 300° C., which is complete during the catalytic tests by about 400 to 450° C. In the falling part of the test program, all three catalytic converters have a very high activity corresponding substantially to the starting level of the fresh catalytic converters.

FIG. 2 shows a thermal analysis plot (temperature-programmed heating of the sample in a gas stream with analysis of the offgas) of example 2, tracking the mass of 44 for $CO_2$. It is clearly apparent that, above 250 to 300° C., $CO_2$ is emitted by the sample, from which it is possible to conclude the oxidation of soot-like deposits on the catalytic converter surface.

After deactivation in cement works, the catalytic converters of example 2 were treated repeatedly in a muffle furnace at 550° C. under air for 3 hours and then reinstalled back in the plant in the cement works. After being regenerated in the muffle furnace, they attained their original performance again in the cement works and showed deactivation in the range from 2 to 6 hours, i.e. corresponding to the respective fresh catalytic converter. The same observation was made when the deactivated catalytic converter of example 2, at the site of the use thereof, i.e. in the plant for cleaning of the offgas in the cement works, was regenerated in the same way.

A regeneration was also conducted during the operation of the catalytic converter according to example 2 under real offgas in the cement works. This involved operating the catalytic converter at a GHSV of 12 000 l/h and a temperature of 550° C. The catalytic converter efficiency found over a period of 5 hours was a constant CO deposition level of about 95%. If the catalytic converter for example 2 was operated under the same conditions but at a temperature of 250° C. (rather than 550° C.), a very distinct reduction in the CO deposition level was already found after 5 hours.

FIG. 3 additionally shows a thermal analysis plot for the oxidation catalyst from example 2, with recording of mass 44 on the mass spectrometer as a function of time with simultaneous measurement of temperature. It is clear from this that heating of the catalytic converter according to example 2 to a temperature above 280° C., for example in the region of more than 300° C. or more than 350° C., for a period of more than one hour leads to desorption of $CO_2$.

The heating of the oxidation catalyst according to example 2 up to 500° C. and/over 2 hours leads to complete combustion of the soot present, since no further $CO_2$ is formed after 2 hours. Intermittent operation or periodic heating of the catalytic converter according to example 2 at temperatures above 280° C., for example in the range from 350 to 400° C., especially for longer than 1 hour, thus enables regeneration of the oxidation catalyst.

The invention claimed is:

1. A method for cleaning offgas and for regenerating an oxidation catalyst, comprising the steps of
   treating the offgas in an oxidation catalyst comprising a catalytically active material, wherein the catalytically active material includes a microporous zeolite material containing at least one noble metal and/or at least one base transition metal, wherein the microporous zeolite material is selected from the group consisting of AFI, AEL, BEA, CHA, EUO, FAU, FER, KFI, LTL, MAZ, MOR, MEL, MTW, OFF, TON and MFI,
   wherein the oxidation catalyst is operated continuously or intermittently at a temperature which brings about the oxidation of soot and/or carbon particles, and/or
   wherein the oxidation catalyst is heated periodically to a temperature which brings about the oxidation of soot and/or carbon particles, and
wherein the offgas is produced by combustion with a high calorific value; and/or
   wherein the offgas is produced by combustion of substitute fuels; and/or
   wherein the offgas is produced in the manufacture of cement; and/or
   wherein the offgas is produced in the combustion of wood, biomass, mineral oil, natural gas, used oil, used tires, used solvents, industrial or communal refuse, waste and/or controlled waste and/or in the manufacture of cement or in a sintered metal plant.

2. The method as claimed in claim 1,
   wherein the temperature which brings about the oxidation of soot and/or carbon particles is within a region above 280° C.

3. The method as claimed in claim 1,
   wherein the intermittent operation or the periodic heating of the oxidation catalyst at/to the temperature which brings about the oxidation of soot and/or carbon particles is conducted at time intervals of 0.5 to 10 hours.

4. The method as claimed in claim 1,
   wherein the temperature which brings about the oxidation of soot and/or carbon particles in the continuous or intermittent operation or in the periodic heating of the oxidation catalyst is set by means of the offgas and/or by means of a heating unit and/or a heat exchanger.

5. The method as claimed in claim 1,
   wherein the periodic heating of the oxidation catalyst is conducted during or outside the operation of the oxidation catalyst; and/or
   wherein the periodic heating of the oxidation catalyst is conducted in an apparatus in which the oxidation catalyst is used for cleaning of the offgas.

6. The method as claimed in claim 1,
   wherein the continuous or intermittent operation and/or the periodic heating of the oxidation catalyst is conducted in the presence of oxygen and/or air.

7. The method as claimed in claim 1, wherein the oxidation catalyst is used for the degradation of CO and/or hydrocarbons.

8. The method as claimed in any claim 1,
   wherein the noble metal used is at least one metal from the platinum group of the Periodic Table and/or Pt and/or Pd; and/or
   wherein the base transition metal is selected from the group consisting of Co, Mn, Cu, Cr and Fe or a combination of the transition metals and/or is present as an oxide and/or is reducible.

9. The method as claimed in claim 1,
   wherein the catalytically active material is used in the form of a solid extrudate or in the form of a washcoat on a support body.

10. The method as claimed in claim 1,
    wherein the catalytically active material includes a porous $SiO_2$ binder; and/or
    wherein the catalytically active material includes oxides of Si, Ti and/or W; and/or
    wherein the catalytically active material includes alumina doped with Ce, La and/or Y; and/or
    wherein the catalytically active material includes at least one oxide of the elements from groups IIIa, IVa, IIIb and/or IVb of the Periodic Table of the Elements; and/or
    wherein the catalytically active material contains at least one additive; and/or
    wherein the catalytically active material has a BET surface area of at least 0.1 $m^2/g$.

11. The method as claimed in claim 10, wherein the catalytically active material includes an oxide of Al, Si, Ti and/or Zr.

12. The method as claimed in claim 10, wherein the at least one additive is a compound of the alkali metals and/or alkaline earth metals.

13. The method as claimed in claim 10, wherein the catalytically active material has a BET surface area of at least 10 $m^2/g$.

14. The method as claimed in claim 10, wherein the catalytically active material has a BET surface area of at least 20 $m^2/g$.

15. The method as claimed in claim 1, comprising the steps of
    treating the offgas in the oxidation catalyst;
    Introducing reducing agent into the offgas; and
    treating the offgas in the catalytic converter for selective catalytic reduction;
wherein the introduction of the reducing agent is conducted prior to the treatment of the offgas in the catalytic converter for selective catalytic reduction.

16. The method as claimed in claim 15,
    wherein the treatment of the offgas in the oxidation catalyst is conducted prior to the introduction of the reducing agent into the offgas or after the treatment of the offgas in the catalytic converter for selective catalytic reduction; and/or
    wherein the reducing agent is first introduced into the offgas, then the offgas is treated in the catalytic converter for selective catalytic reduction and then in the oxidation catalyst.

17. The method as claimed in claim 15,
    wherein the offgas is cleaned at a temperature above 300° C. and/or
    wherein the reducing agent used is ammonia and/or urea.

18. The method as claimed in claim 17, wherein the offgas is cleaned at a temperature above 350° C., and/or below 600° C.

19. The method as claimed in claim 17, wherein the offgas is cleaned at a temperature below 550° C.

20. The method as claimed in claim 1, wherein the temperature which brings about the oxidation of soot and/or carbon particles is within a region above 300° C.

21. The method as claimed in claim 1, wherein the temperature which brings about the oxidation of soot and/or carbon particles is within a region above 350° C.

22. The method as claimed in claim 1,
wherein the intermittent operation or the periodic heating of the oxidation catalyst at/to the temperature which brings about the oxidation of soot and/or carbon particles is conducted at time intervals of 1 to 6 hours; and/or wherein the temperature which brings about the oxidation of soot and/or carbon particles in the intermittent operation or in the periodic heating of the oxidation catalyst is set for a period in the range from 0.25 to 2 hours.

* * * * *